United States Patent
Ito et al.

(10) Patent No.: US 11,145,882 B2
(45) Date of Patent: Oct. 12, 2021

(54) FUEL CELL SYSTEM

(71) Applicant: TOYOTA JIDOSHA KABUSHIKI KAISHA, Toyota (JP)

(72) Inventors: Masayuki Ito, Sunto-gun (JP); Hideyuki Kumei, Sunto-gun (JP); Tomohiko Kaneko, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 16/580,267

(22) Filed: Sep. 24, 2019

(65) Prior Publication Data
US 2020/0112041 A1 Apr. 9, 2020

(30) Foreign Application Priority Data
Oct. 5, 2018 (JP) .............................. JP2018-190436

(51) Int. Cl.
*H01M 8/04* (2016.01)
*H01M 8/04858* (2016.01)
*H01M 8/04082* (2016.01)
*H01M 8/04746* (2016.01)
*H01M 8/04537* (2016.01)
*B60L 50/72* (2019.01)

(52) U.S. Cl.
CPC ..... *H01M 8/04925* (2013.01); *H01M 8/0488* (2013.01); *H01M 8/04201* (2013.01); *H01M 8/04552* (2013.01); *H01M 8/04559* (2013.01); *H01M 8/04753* (2013.01); *B60L 50/72* (2019.02); *B60Y 2400/202* (2013.01); *H01M 2250/20* (2013.01)

(58) Field of Classification Search
CPC ......... H01M 8/04201; H01M 8/04552; H01M 8/04559; H01M 8/04753; H01M 8/0488; H01M 8/04925
USPC ....................................................... 429/432
See application file for complete search history.

(56) References Cited

U.S. PATENT DOCUMENTS

2012/0088171 A1* 4/2012 Edmiston ............ H01M 8/0494
429/429
2016/0141905 A1 5/2016 Yamanaka et al.

FOREIGN PATENT DOCUMENTS

| JP | 62-150664 | 7/1987 |
|---|---|---|
| JP | 2006-179242 | 7/2006 |
| JP | 2010-055927 | 3/2010 |
| JP | 2016-096086 | 5/2016 |

* cited by examiner

*Primary Examiner* — James M Erwin
(74) *Attorney, Agent, or Firm* — Finnegan, Henderson, Farabow, Garrett & Dunner, LLP (57) ABSTRACT

A fuel cell system includes: a fuel cell unit; first and second supply systems; a switching device; a switching control unit; an open circuit voltage obtaining unit; and a supply system control unit.

6 Claims, 7 Drawing Sheets

FUEL CELL SYSTEM

CROSS-REFERENCE TO RELATED APPLICATION

This application is based upon and claims the benefit of priority of the prior Japanese Patent Application No. 2018-190436, filed on Oct. 5, 2018, the entire contents of which are incorporated herein by reference.

TECHNICAL FIELD

The present disclosure relates to a fuel cell system.

BACKGROUND

When required power of a fuel cell is equal to or smaller than a threshold, the fuel cell is electrically disconnected to load devices. When an open circuit voltage of the fuel cell in this state is too high, a cathode catalyst of the fuel cell might be eluted. Therefore, the open circuit voltage is suppressed from being too high, by supplying a sufficient amount of hydrogen to the inside of the fuel cell and by controlling a flow rate of cathode gas to be smaller than a usual flow rate so as to reduce the amount of oxygen remaining inside the fuel cell. However, when the required power increases in a state where the amount of oxygen remaining inside the fuel cell is too small, a response of the actual power deteriorates. For this reason, the flow rate of the cathode gas is increased and decreased such that the open circuit voltage converges within a target range (See, for example, Japanese Unexamined Patent Application Publication No. 2016-096086).

In a fuel cell system including such fuel cells, it is conceivable that any open circuit voltages of the fuel cells are low when the required power increases. In this case, the response of the actual power to the required power might deteriorate.

SUMMARY

It is therefore an object of the present disclosure to provide a fuel cell system in which a response to required power is improved.

The above object is achieved by a fuel cell system including: a fuel cell unit including first and second fuel cells that supplies electric power to a load device; first and second supply systems configured to respectively control first and second flow rates of cathode gas respectively supplied to the first and second fuel cells; a switching device capable of switching the fuel cell unit and the load device between an electrically connected state where the fuel cell unit is electrically connected to the load device and an electrically disconnected state where the fuel cell unit is electrically disconnected to the load device; a switching control unit configured to switch the fuel cell unit and the load device to the electrically disconnected state, when required power of the fuel cell unit is equal to or smaller than a threshold; an open circuit voltage obtaining unit configured to obtain a first open circuit voltage of the first fuel cell and a second open circuit voltage of the second fuel cell in the electrically disconnected state; and a supply system control unit configured to increase and decrease the first and second open circuit voltages so as to respectively converge within first and second target ranges, by controlling the first and second supply systems to increase and decrease the first and second flow rates, wherein a lower limit value of the first target range is greater than a lower limit value of the second target range.

The lower limit value of the first target range is greater than the lower limit value of the second target range, thereby ensuring a period in which the first open circuit voltage is higher than the second open circuit voltage. This causes both first and second open circuit voltages to avoid being in low states, thereby improving a response to required power.

A size of one of the first and second target ranges may be larger than the other one of the first and second target ranges.

The first and second target ranges at least may partially overlap each other.

An upper limit value of the first target range may be identical to an upper limit value of the second target range.

An upper limit value of the first target range may be greater than an upper limit value of the second target range.

Further, the above objection is achieved by a fuel cell system including: a fuel cell unit including first and second fuel cells that supplies electric power to a load device; first and second supply systems configured to respectively control first and second flow rates of cathode gas respectively supplied to the first and second fuel cells; a switching device capable of switching the fuel cell unit and the load device between an electrically connected state where the fuel cell unit is electrically connected to the load device and an electrically disconnected state where the fuel cell unit is electrically disconnected to the load device; a switching control unit configured to switch the fuel cell unit and the load device to the electrically disconnected state, when required power of the fuel cell unit is equal to or smaller than a threshold; an open circuit voltage obtaining unit configured to obtain a first open circuit voltage of the first fuel cell and a second open circuit voltage of the second fuel cell in the electrically disconnected state; and a supply system control unit configured to increase and decrease the first and second open circuit voltages so as to respectively converge within first and second target ranges, by controlling the first and second supply systems to increase and decrease the first and second flow rates, wherein a lower limit value of the first target range is identical to a lower limit value of the second target range, and an upper limit value of the first target range is greater than an upper limit value of the second target range.

DETAILED DESCRIPTION

[Configuration of Fuel Cell System]

Figure 1:
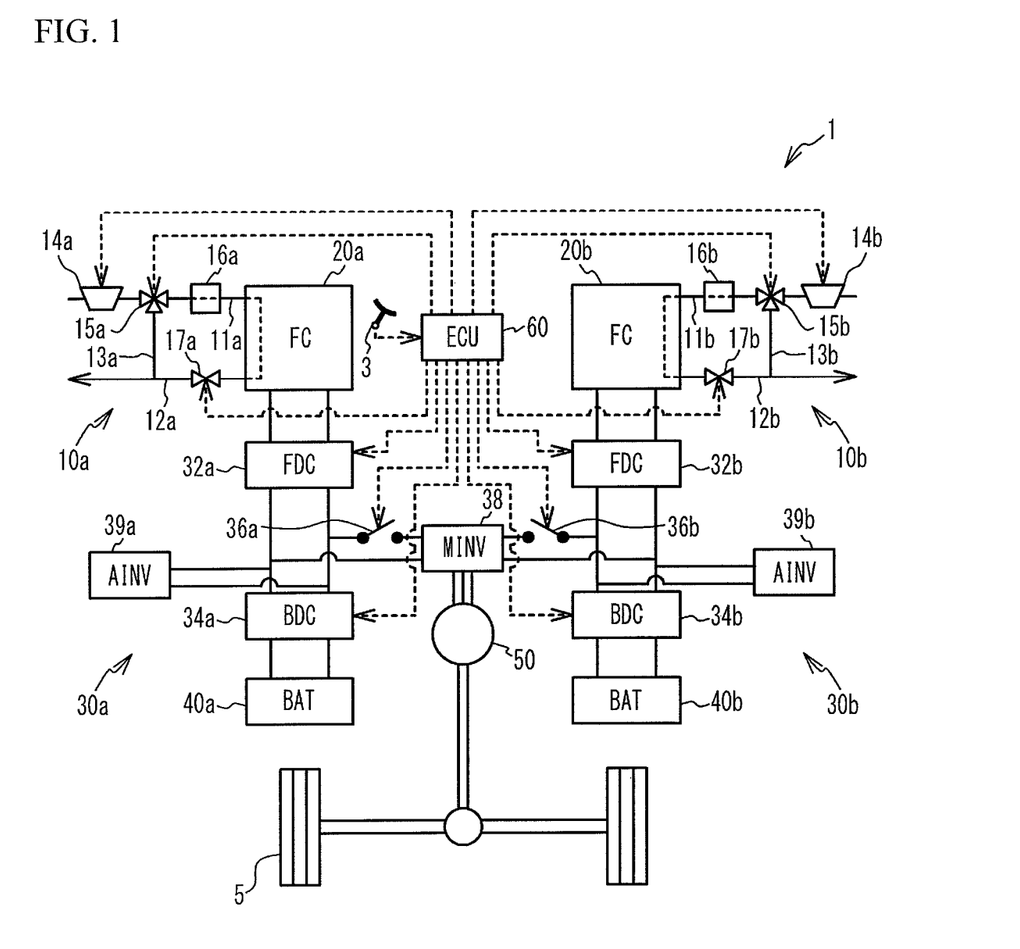
FIG. 1 is a configurational view of a fuel cell system installed in a vehicle.

FIG. 1 is a configurational view of a fuel cell system (hereinafter simply referred to as a system) 1 installed in a vehicle. The system 1 includes cathode gas supply systems 10a and 10b, fuel cells (hereinafter referred to as FCs) 20a and 20b, power control systems 30a and 30b, batteries (hereinafter referred to as BATs) 40a and 40b, a motor 50, and an electronic control unit (ECU) 60. Further, the system 1 includes an anode gas supply system (not illustrated) that supplies hydrogen gas as anode gas to the FCs 20a and 20b, and a cooling system (not illustrated) that circulates cooling water through the FCs 20a and 20b and cools the FCs 20a and 20b.

The FCs 20a and 20b are fuel cells that receive cathode gas and the fuel gas to generate electric power. Each of the FCs 20a and 20b is formed by stacking unit cells of solid polymer electrolyte types. The FCs 20a and 20b are, not particularly limited, the same fuel cells, and the rated power is also the same. The FCs 20a and 20b are examples of a fuel cell unit, and are also examples of first and second fuel cells, respectively.

The cathode gas supply systems 10a and 10b respectively supply air containing oxygen as the cathode gas to the FCs 20a and 20b. Specifically, the cathode gas supply systems 10a and 10b respectively include supply pipes 11a and 11b, discharge pipes 12a and 12b, bypass pipes 13a and 13b, air compressors 14a and 14b, bypass valves 15a and 15b, intercoolers 16a and 16b, and back pressure valves 17a and 17b.

The supply pipes 11a and 11b are respectively connected to cathode inlet manifolds of the FCs 20a and 20b. The discharge pipes 12a and 12b are respectively connected to cathode outlet manifolds of FCs 20a and 20b. The bypass pipe 13a communicates with the supply pipe 11a and the discharge pipe 12a. Likewise, the bypass pipe 13b communicates with the supply pipe 11b and the discharge pipe 12b. The bypass valve 15a is provided at a joint portion of the supply pipe 11a and the bypass pipe 13a. Likewise, the bypass valve 15b is provided at a joint portion of the supply pipe 11b and the bypass pipe 13b. The bypass valve 15a switches a communication state between the supply pipe 11a and the bypass pipe 13a. Likewise, the bypass valve 15b switches the communication state between the supply pipe 11b and the bypass pipe 13b. The air compressor 14a, the bypass valve 15a, and the intercooler 16a are disposed on the supply pipe 11a in this order from the upstream side. The back pressure valve 17a is disposed on the discharge pipe 12a and on the upstream side of a joint portion of the discharge pipe 12a and the bypass pipe 13a. Likewise, the air compressor 14b, the bypass valve 15b, and the intercooler 16b are disposed on the supply pipe 11b in this order from the upstream side. The back pressure valve 17b is disposed on the discharge pipe 12b and on the upstream side of a joint portion of the discharge pipe 12b and the bypass pipe 13b.

The air compressors 14a and 14b respectively supply air containing oxygen as the cathode gas to the FCs 20a and 20b through the supply pipes 11a and 11b. The cathode gas supplied to the FCs 20a and 20b is respectively discharged through the discharge pipes 12a and 12b. The intercoolers 16a and 16b respectively cool the cathode gas supplied to the FCs 20a and 20b. The back pressure valves 17a and 17b respectively adjust the back pressure on the cathode side of the FCs 20a and 20b.

The power control systems 30a and 30b include fuel cell DC/DC converters (hereinafter referred to as FDCs) 32a and 32b, battery DC/DC converters (hereinafter referred to as BDCs) 34a and 34b, switches 36a and 36b, and auxiliary device inverters (hereinafter referred to as AINV) 39a and 39b. Further, the power control systems 30a and 30b share a motor inverter (hereinafter referred to as MINV) 38 connected to the motor 50. The FDCs 32a and 32b respectively adjust direct-current power from the FCs 20a and 20b, and output the direct-current power to the MINV 38. The BDCs 34a and 34b respectively adjust direct-current power from the BATs 40a and 40b, and output the direct-current power to the MINV 38. The electric power generated by the FCs 20a and 20b is respectively stored in the BATs 40a and 40b. The MINV 38 converts the input direct-current power into three-phase alternating-current power, and supplies the three-phase alternating-current power to the motor 50. The motor 50 drives wheels 5 to drive the vehicle.

The switch 36a opens and closes in response to a command from the ECU 60. When the switch 36a opens, the FC 20a and the BAT 40a are electrically disconnected from the MINV 38, and when the switch 36a closes, the FC 20a and the BAT 40a are connected to the MINV 38. Likewise, the switch 36b opens and closes in response to a command from the ECU 60. When the switch 36b opens, the FC 20b and the BAT 40b are electrically disconnected from the MINV 38, and when the switch 36b closes, the FC 20b and the BAT 40b are connected to the MINV 38. In the disconnected state, the FCs 20a and 20b are electrically disconnected from load devices including the motor 50. The switches 36a and 36b are examples of a switching device capable of switching the FCs 20a and 20b and the load devices between the electrically connected state where the FCs 20a and 20b are electrically connected to the load devices and the electrically disconnected state where the FCs 20a and 20b are electrically disconnected to the load devices. Herein, the load devices include auxiliary devices for the FCs 20a and 20b and auxiliary devices for the vehicle, in addition to the motor 50. The auxiliary devices for the FCs 20a and 20b include the above-described air compressors 14a and 14b, the bypass valves 15a and 15b, the back pressure valves 17a and 17b, and injectors for supplying the anode gas included in the anode gas supply system to the FCs 20a and 20b, respectively. The auxiliary devices for the vehicle include, for example, an air conditioner, lighting devices, and hazard lamps. Even when the FCs 20a and 20b and the BATs 40a and 40b are disconnected from the MINV 38 by the switches 36a and 36b, the storage power of the BATs 40a and 40b are respectively boosted by the BDCs 34a and 34b, and are capable of being supplied to the air compressors 14a and 14b, the bypass valves 15a and 15b, and the back pressure valves 17a and 17b via the AINVs 39a and 39b. In the present embodiment, the switches 36a and 36b are described as components separated from the FDCs 32a and 32b, but switches respectively provided within the FDCs 32a and 32b may switch between the connected state and the disconnected state.

The ECU 60 includes a central processing unit (CPU), a read only memory (ROM), and a random access memory (RAM). The ECU 60 is electrically connected to an accelerator opening degree sensor 3, the air compressors 14a and 14b, the bypass valves 15a and 15b, the back pressure valves 17a and 17b, the FDCs 32a and 32b, the BDCs 34a and 34b, and the switches 36a and 36b.

The ECU 60 calculates an accelerator opening degree of an opening degree of an accelerator pedal operated by a driver on the basis of the detection value of the accelerator opening degree sensor 3. The ECU 60 calculates an amount of the electrical power needed for driving the motor 50 on the basis of the accelerator opening degree. The ECU 60 calculates the required power of the entire FCs 20a and 20b, on the basis of the power required to drive the auxiliary devices for the FCs 20a and 20b such as the air compressors 14a and 14b, the auxiliary devices for the vehicle such as the motor 50, and the storage power of the BATs 40a and 40b. The ECU 60 controls the FDCs 32a and 32b and the BDCs 34a and 34b so as to supply the amount of the electrical power corresponding to the required power of the entire FCs 20a and 20b from the entire FCs 20a and 20b to the MINV 38. In the present specification, "required power" means, not each required power of the FCs 20a and 20b, but the required power of the entire FCs 20a and 20b, that is, the required power of the fuel cell unit.

Further, the ECU 60 executes open-circuit voltage control as will be described later in detail. The open-circuit voltage control is executed by a switching control unit, an open circuit voltage obtaining unit, and a supply system control unit that are functionally implemented by the CPU, the ROM, and the RAM.

[Open Circuit Voltage]

For example, when the accelerator opening degree decreases, the required power also decreases. When the required power is equal to or smaller than a threshold described later, the switches 36a and 36b electrically disconnect the FCs 20a and 20b from the load devices, and then the vehicle is brought into an idle state. Herein, in the disconnected state where the FCs 20a and 20b are electrically disconnected from the load devices, the FCs 20a and 20b are in a state where power generation is temporarily stopped. In such a state, each current of the FCs 20a and 20b is zero, and each voltage in this state is referred to as an open circuit voltage. When an increase in the accelerator opening degree makes the required power greater than the threshold again in such an idle state, the switches 36a and 36b electrically connect the FCs 20a and 20b to the load devices. Thus, the electric power generated by the FCs 20a and 20b is supplied to the motor 50, and then the vehicle is in a driving state.

Herein, in the disconnected state where the FCs 20a and 20b are electrically disconnected from the load devices, oxygen and hydrogen are not consumed in electric power generation. However, hydrogen cross-leaks from an anode side to a cathode side through an electrolyte membrane, so that hydrogen and oxygen react to form water on the cathode side. This reduces the oxygen concentration on the cathode side.

A decrease in the oxygen concentration on the cathode side decreases the open circuit voltage. The open circuit voltage is desirably kept high even in the disconnected state, in consideration of the response of the actual power of the FCs 20a and 20b when the required power increases after the open circuit voltage is decreased. This is because a high open circuit voltage means high oxygen concentration on the cathode side, and the electric power of the FCs 20a and 20b responsively increases when the required power increases in a state of the high oxygen concentration on the cathode side. However, the open circuit voltage is too high, so that the cathode catalyst might be eluted to reduce the power performance of the FCs 20a and 20b. Therefore, the above-described open-circuit voltage control for holding the open circuit voltage within a predetermined target range is executed. In the open-circuit voltage control, the flow rate of the cathode gas supplied to each of the FCs 20a and 20b increases and decreases such that each open circuit voltage of the FCs 20a and 20b repeatedly increases and decreases to converge within the target range. Additionally, the above target range is not a range in which a problem occurs immediately when the open circuit voltage deviates from the target range. The target ranges of the open circuit voltages of the FCs 20a and 20b are respective examples of the first and second target ranges.

[Timing Chart of Open-Circuit Voltage Control]

Figure 2:
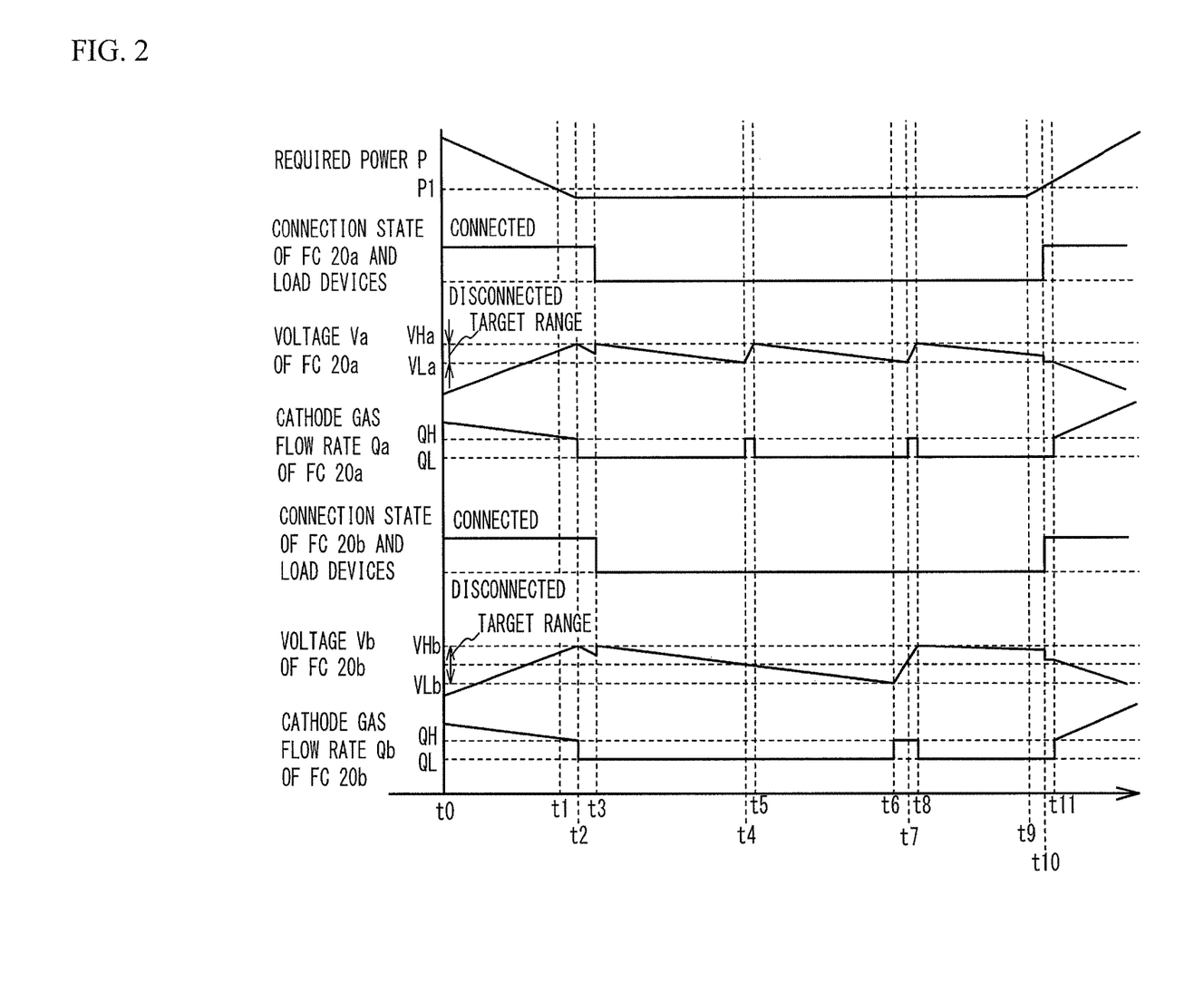
FIG. 2 is a timing chart illustrating an example of open-circuit voltage control.

FIG. 2 is a timing chart illustrating an example of the open-circuit voltage control. FIG. 2 illustrates a transition of the required power P, the connected state between each of the FCs 20a and 20b and the load devices, a transition of the respective flow rates Qa and Qb of the cathode gas supplied to the FCs 20a and 20b, and a transition of the respective voltages Va and Vb of the FCs 20a and 20b. In addition, the flow rates Qa and Qb during the execution of the open-circuit voltage control described below are controlled by adjusting the opening degree of the bypass valves 15a and 15b while keeping the rotational speeds of the air compressors 14a and 14b constant and keeping the opening degree of the back pressure valves 17a and 17b constant.

For example, when the accelerator opening degree gradually decreases while the vehicle is in a driving state, the required power gradually decreases from time t0. When the required power decreases, the flow rates Qa and Qb decrease so as to decrease the power of the FCs 20a and 20b. Further, the power of the FCs 20a and 20b decrease, so the currents of the FCs 20a and 20b decrease and the voltages Va and Vb increase.

For example, when the accelerator opening degree reaches zero, the required power P is equal to or smaller than a threshold P1 at time t1. The threshold P1 is a preset value and is a threshold for determining whether the required power P may be regarded as substantially zero. In other words, the threshold P1 is a threshold for determining whether there may be no power generation request to the FCs 20a and 20b. Additionally, when the required power P is greater than the threshold P1, the flow rates Qa and Qb are controlled to be each greater than a target flow rate QH. Further, the threshold P1 is not limited to substantially zero, for example, and may be a value of small power required to drive the vehicle and to operate the auxiliary devices, which can be sufficiently managed only by the BATs 40a and 40b.

At time t2 when the required power P is substantially constant after a predetermined minute time has elapsed from time t1 when the required power P is equal to or smaller than the threshold P1, the flow rates Qa and Qb are each controlled to be the target flow rate QL. The target flow rate QL is smaller than the target flow rate QH. The flow rates Qa and Qb are each controlled to be from the target flow rate QH to the target flow rate QL, by controlling the opening degrees of the bypass valves 15a and 15b so as to increase the flow rates of cathode gas flowing through the bypass pipes 13a and 13b. When the flow rates Qa and Qb are each controlled to be the target flow rate QL, each IV characteristic of the FCs 20a and 20b deteriorates as compared to an IV characteristic at the time of normal power generation. Therefore, the voltages Va and Vb starts decreasing from time t2.

At time t3 when a predetermined time has elapsed from time t2 at which the voltages Va and Vb start decreasing, the FCs 20a and 20b are disconnected from the load devices and the open-circuit voltage control starts. Thereafter, the voltages Va and Vb immediately increase, and each current of the FCs 20a and 20b, not illustrated, reaches zero. In the state where the FCs 20a and 20b are disconnected from the load devices, the voltages Va and Vb respectively correspond to the open circuit voltages of the FCs 20a and 20b.

In addition, although mentioned later in detail, the timing of the disconnection is adjusted such that the voltages Va and Vb, which increase immediately after the FC20a and 20b are disconnected from the load devices, are respectively equal to or lower than upper limit values VHa and VHb. The upper limit values VHa and VHb are preset.

The voltages Va and Vb decrease due to the above-described cross leak from time t3. That is, the target flow rate QL is set to a low flow rate so as not to increase the open circuit voltage even in consideration of the cross leak. This is because the decrease rate of the oxygen concentration due to the cross leak varies depending on the use environment and the use time of the fuel cell, and it is difficult to estimate the decrease rate beforehand.

When the voltage Va of the FC 20a reaches a lower limit value VLa at time t4, the flow rate Qa of the cathode gas to the FC 20a is controlled to increase to the target flow rate QH, so that the voltage Va starts increasing. The target flow rate QH is set to a flow rate so as to increase the oxygen concentration even in consideration of a decrease amount of the oxygen concentration due to the cross leak. The lower limit value VLa that will be described later in detail is preset.

When the voltage Va is equal to or higher than the upper limit value VHa at time t5, the flow rate Qa is controlled to decrease again to the target flow rate QL, and then the voltage Va starts decreasing. When the voltage Vb reaches a lower limit value VLb at time t6, the flow rate Qb is controlled to increase to the target flow rate QH, and then the voltage Vb starts increasing. The lower limit value VLb is preset. When the voltage Va reaches the lower limit value VLa at time t7, the flow rate Qa is controlled to increase to the target flow rate QH, and then the voltage Va starts increasing. When the voltage Va reaches the upper limit value VHa at time t8, the flow rate Qa is controlled to decrease to the target flow rate QL, and then the voltage Va starts decreasing. Likewise, when the voltage Vb reaches the upper limit value VHb at time t8, the flow rate Qb is controlled to increase to the target flow rate QL, and then the voltage Vb starts decreasing.

As described above, the upper limit values VHa and VHb are the upper limit values of the target ranges of the open circuit voltage, and the lower limit values VLa and VLb are the lower limit values thereof. Therefore, the flow rates Qa and Qb are controlled to increase and decrease such that the voltages Va and Vb repeatedly increase and decrease to converge within the target range. The upper limit values VHa and VHb are voltage values suitable for suppressing the elution of the cathode catalyst as described above, and may be within the range, for example, from 0.75 V to 0.9 V, and more specifically, 0.85 V. The lower limit values VLa and VLb are voltage values suitable for ensuring a good response to the required power, and may be within the range, for example, from 0.5 V to 0.8 V, more specifically, 0.77 V of the lower limit value VLa, and 0.7 V of the lower limit value VLb.

When the required power P starts increasing at time t9, the required power P is greater than the threshold P1 at time t10, and the FCs 20a and 20b are connected to the load devices. After that, the voltages Va and Vb immediately decrease, and each current of the FCs 20a and 20b, not illustrated, immediately increases. By controlling the flow rates Qa and Qb to be each greater than the target flow rate QH at time t11, the voltages Va and Vb decrease, and the power of the FCs 20a and 20b, not illustrated, increases. In the present embodiment, the flow rates Qa and Qb increase at time t11, after the FCs 20a and 20b are connected to the load devices at time t10, but not limited thereto. The FCs 20a and 20b may be connected to the load devices, after the flow rates Qa and Qb increase. The flow rates Qa and Qb may increase and the FCs 20a and 20b may be connected to the load devices simultaneously.

Figure 3:
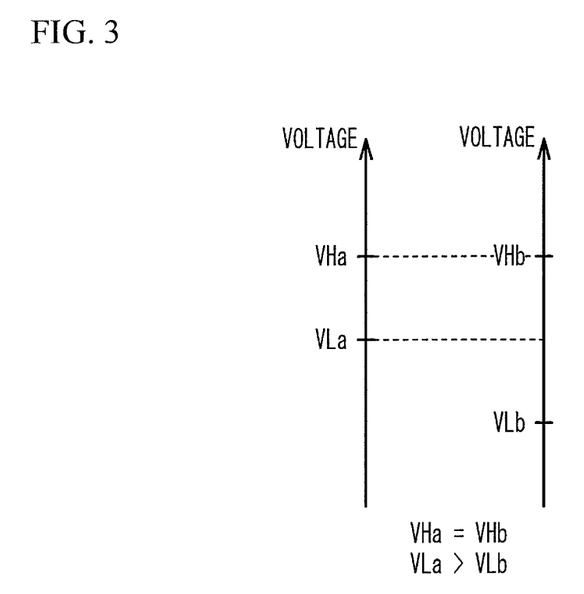
FIG. 3 is an explanatory view of a magnitude relationship among upper limit values and lower limit values.

FIG. 3 is an explanatory view of a magnitude relationship among the upper limit values VHa and VHb and the lower limit values VLa and VLb described above. As illustrated in FIG. 3, the lower limit value VLa is greater than the lower limit value VLb. Thus, the voltage Va is maintained in a high state so as not to be smaller than the lower limit value VLa, which ensures a period in which the voltage Va is higher than the voltage Vb. Accordingly, both voltages Va and Vb avoid being low. For example, when the required power P increases and exceeds the threshold P1 and when both voltages Va and Vb are low, the response of the actual power of the FCs 20a and 20b to the required power P might deteriorate to influence the drivability, since both voltages Va and Vb are low. In the present embodiment, the occurrence of the above problem is suppressed.

Further, a difference between the upper limit value VHb and the lower limit value VLb is greater than a difference between the upper limit value VHa and the lower limit value VLa. Therefore, in a period in which the open circuit voltage control is executed, the number of switching times between the increase and the decrease of the flow rate Qb is smaller than the number of switching times between the increase and the decrease of the flow rate Qa. Accordingly, a frequency in which the opening degree of the bypass valve 15b is changed for switch of the flow rate Qb is smaller than a frequency in which the opening degree of the bypass valve 15a is changed for switch of the flow rate Qa. This suppresses the deterioration of the durability of the bypass valve 15b.

Furthermore, the target range of the voltage Va from the upper limit value VHa to the lower limit value VLa partially overlaps the target range of the voltage Vb from the upper limit value VHb to the lower limit value VLb. This suppresses wide variation in output performance between the FCs 20a and 20b.

[Flowchart of Open-Circuit Voltage Control]

Figure 4:
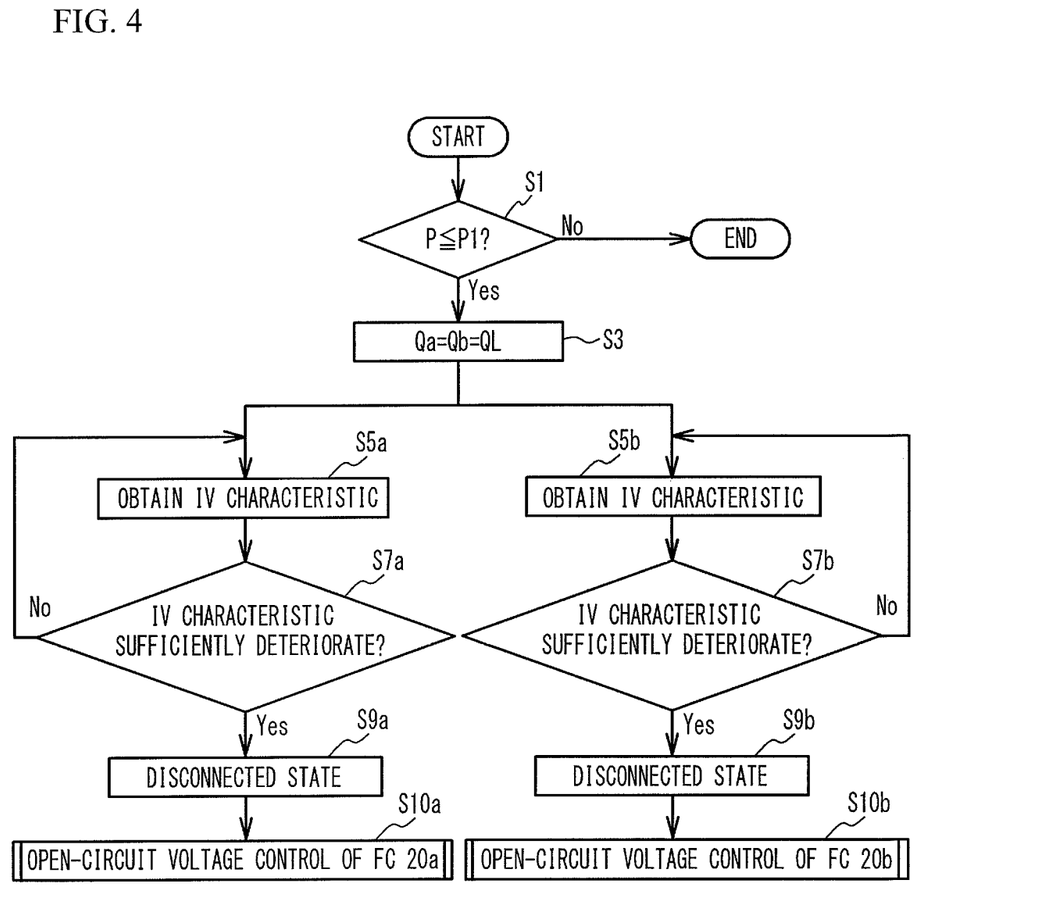
FIG. 4 is a flowchart illustrating an example of the open-circuit voltage control.

FIG. 4 is a flowchart illustrating an example of the open-circuit voltage control. First, the ECU 60 determines whether or not the required power P is equal to or smaller than the threshold P1 (step S1). As described above, the ECU 60 calculates the required power P based on the power required to drive the motor 50 and the auxiliary devices. For example, when the accelerator opening degree is not zero and the vehicle is in a driving state, No is determined in step S1 and the present control is finished.

For example, when the accelerator opening degree is zero, Yes is determined in step S1, and the ECU 60 controls the flow rates Qa and Qb to be the target flow rate QL as at time t2 described above (step S3). Accordingly, the oxygen concentration in the FCs 20a and 20b decreases, and the voltages Va and Vb decrease.

Next, the ECU 60 obtains the IV characteristic of the FC 20a (step S5a), and determines whether or not the IV characteristic of the FC 20a sufficiently deteriorates (step S7a). Likewise, the ECU 60 obtains the IV characteristic of the FC 20b (step S5b), and determines whether or not the IV characteristic of the FC 20b sufficiently deteriorates (step S7b). That is, the target flow rate QL is a flow rate at which the IV characteristic deteriorates due to the low oxygen concentration on the cathode side of the fuel cell in the state where the fuel cell is connected to the load devices. The IV characteristics are obtained on the basis of the respective current values and voltage values of the FCs 20a and 20b after the flow rates Qa and Qb are controlled to be the target flow rate QL. The IV characteristic is considered to deteriorate, as the current value and the voltage value decrease. That is, when the current value and the voltage value are equal to or lower than respective predetermined values, the IV characteristic is determined to sufficiently deteriorate. When No is determined in step S7a, step S5a is executed again. Likewise, when No is determined in step S7b, step S5b is executed again.

When Yes is determined in step S7a, the ECU 60 disconnects the FC 20a from the load devices as at time t3 described above (step S9a). Likewise, when Yes is determined in step S7b, the ECU 60 disconnects the FC 20b from the load devices as at time t3 (step S9b). The processes of steps S9a and S9b are an example of processes executed by the switching control unit configured to switch the FCs 20a and 20b and the load devices to the disconnected state when the required power P is equal to or smaller than the threshold P1. Herein, as illustrated at time t3, the voltages Va and Vb increase to such a degree as not to respectively exceed the upper limit values VHa and VHb immediately after the disconnection. This is because the above-described disconnection is executed after the IV characteristics are determined to sufficiently deteriorate in the above-described steps S7a and S7b. That is, in step S7a, "the IV characteristic sufficiently deteriorates" means that the IV characteristic deteriorates to such an extent that the voltage which increases immediately after the disconnection does not exceed the upper limit value VHa. In step S7b, "the IV characteristic sufficiently deteriorates" means that the IV characteristic deteriorates to such an extent that the voltage which increases immediately after the disconnection does not exceed the upper limit value VHb.

Next, the ECU 60 executes the open-circuit voltage control of the FC 20a (step S10a), and executes the open-circuit voltage control of the FC 20b (step S10b). In addition, the processes of the above steps S5a and S5b and subsequent processes are executed in parallel.

[Flowchart of Open-Circuit Voltage Control of FC 20a]

Figure 5:
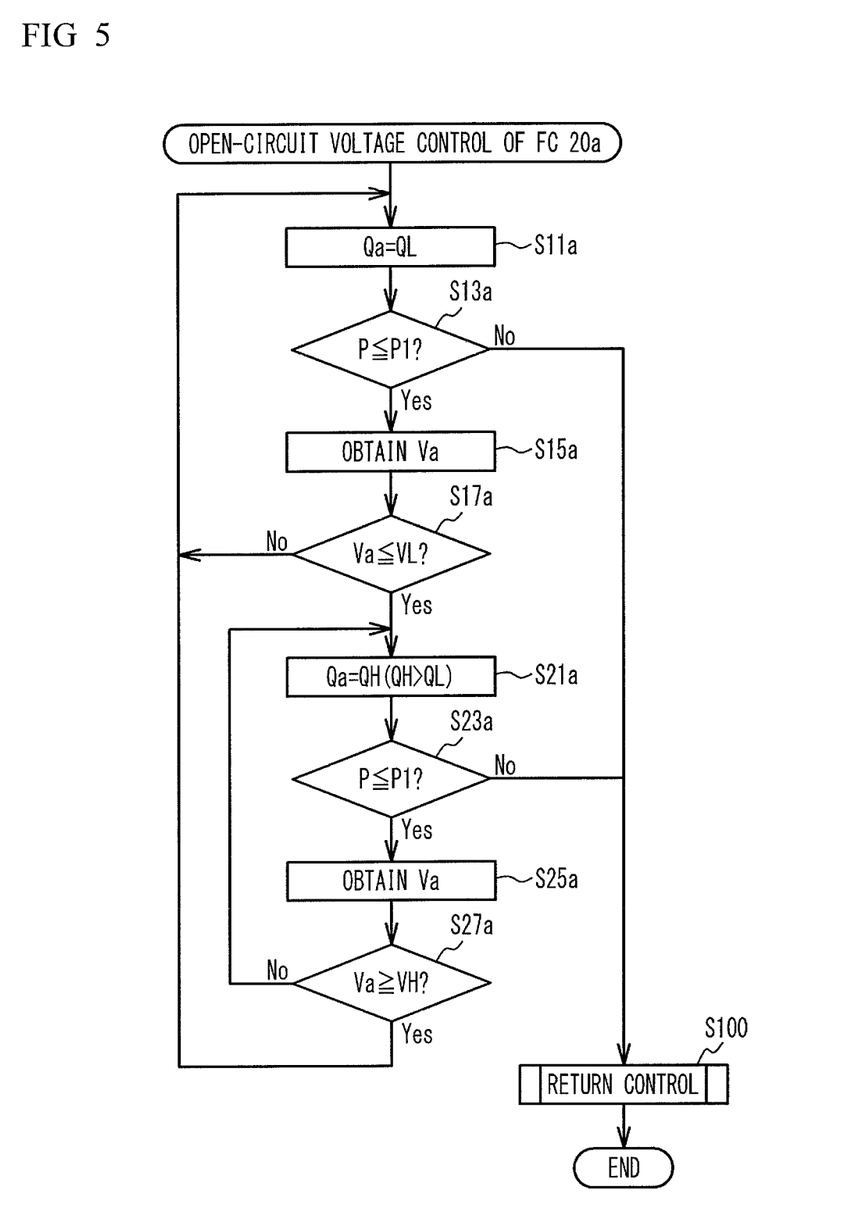
FIG. 5 is a flowchart illustrating an example of the open-circuit voltage control of a first fuel cell.

FIG. 5 is a flowchart illustrating an example of the open-circuit voltage control of the FC 20a. First, the ECU 60 controls the flow rate Qa to be the target flow rate QL (step S11a). When the flow rate Qa has already been controlled to be the target flow rate QL in step S3 described above, this state is continued in step S11a. Next, the ECU 60 determines whether or not the required power P is equal to or smaller than the threshold P1 (step S13a). When No is determined in step S13a, the ECU 60 executes return control for returning the FCs 20a and 20b to the normal power generation state (step S100). The return control will be described later.

When Yes is determined in step S13a, the ECU 60 obtains the voltage Va (step S15a), and determines whether or not the voltage Va is equal to or lower than the lower limit value VLa (step S17a). When No is determined in step S17a, the ECU 60 executes the process of step S11a and subsequent processes again. That is, as long as Yes is determined in step S13a and No is determined in step S17a, the flow rate Qa is controlled to be the target flow rate QL. For example, the flow rate Qa is controlled to be the target flow rate QL as illustrated after the time t2 described above. Since step S13a is repeatedly executed as long as No is determined in step S17a, the return control is executed, even when the required power increases while the flow rate Qa is controlled to be the target flow rate QL.

When Yes is determined in step S17a, for example, as illustrated at time t7, the ECU 60 controls the flow rate Qa to be the target flow rate QH (step S21a). Next, the ECU 60 determines whether or not the required power P is equal to or smaller than the threshold P1 (step S23a). Likewise, when No is determined in step S23a, the return control is executed (step S100).

When Yes is determined in step S23a, the ECU 60 obtains the voltage Va (step S25a), and determines whether or not the voltage Va is equal to or higher than the upper limit value VHa (step S27a). When No is determined in step S27a, the ECU 60 executes the process of step S21a again. As long as Yes is determined in step S23a and No is determined in step S27a, the flow rate Qa is controlled to be the target flow rate QH. That is, as illustrated in the period from time t7 to time t8 described above, the flow rate Qa is controlled to be the target flow rate QH. Since step S23a is repeatedly executed as long as No is determined in step S27a, it is possible to cope with the case where the required power increases while the flow rate Qa is controlled to be the target flow rate QH.

When Yes is determined in step S27a, the ECU 60 executes the process of step S11a and the subsequent processes again, and the flow rate Qa is controlled to be the target flow rate QL, for example, as illustrated at time t8. As described above, by alternately controlling the flow rate Qa to be the target flow rate QH and to be the target flow rate QL, the voltage Va is controlled so as to repeatedly increase and decrease between the upper limit value VHa and the lower limit value VLa. The processes of step S11a, S17a, S21a, and S27a are an example of process executed by the supply system control unit configured to increase and decrease the open circuit voltage of the FC 20a so as to converge within a first target range, by controlling the bypass valve 15a to increase and decrease the flow rate Qa.

Additionally, the process of step S13a may be executed before step S11a, or between steps S15a and S17a. Likewise, the process of step S23a may be executed before step S21a, or between steps S25a and S27a.

[Flowchart of Open-Circuit Voltage Control of FC 20b]

Figure 6:
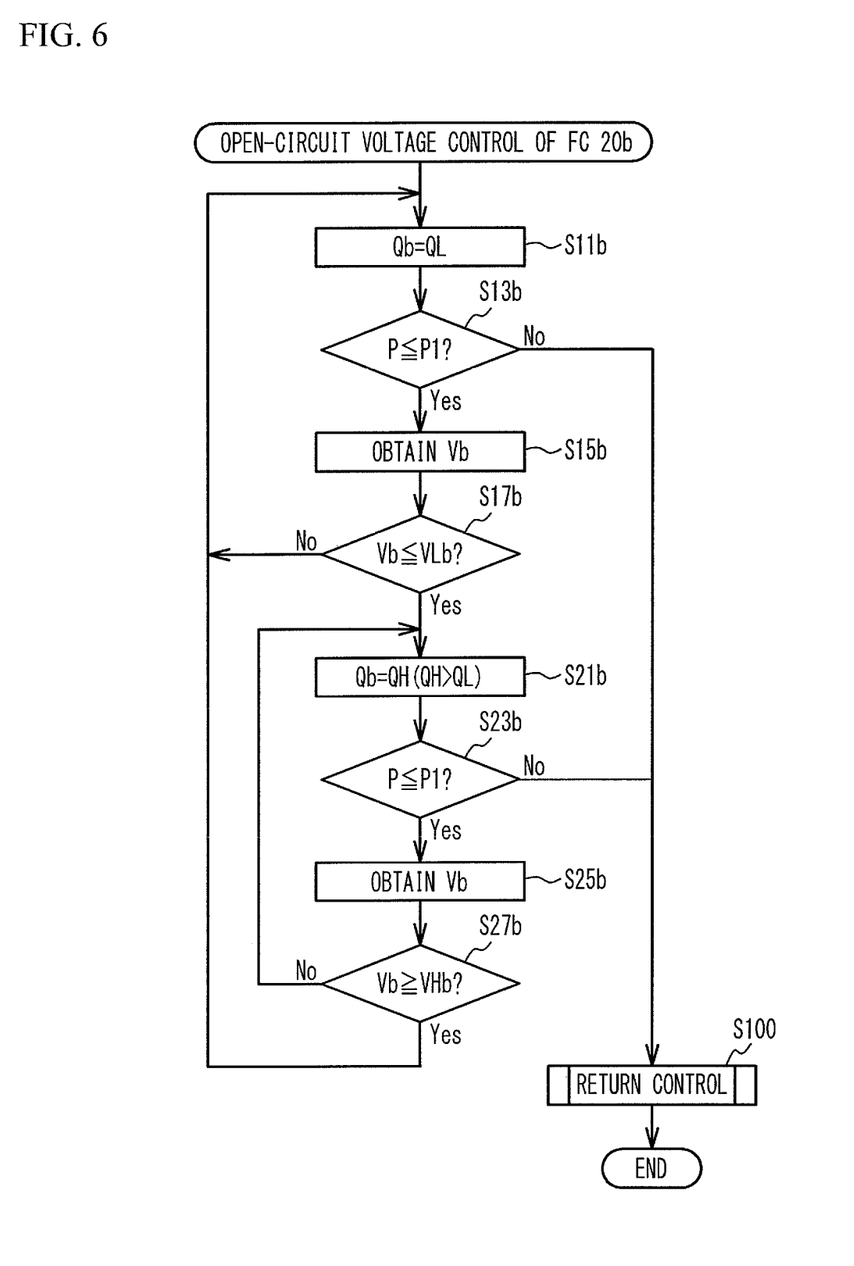
FIG. 6 is a flowchart illustrating an example of the open-circuit voltage control of a second fuel cell.

FIG. 6 is a flowchart illustrating an example of open-circuit voltage control of the FC 20b. First, the ECU 60 controls the flow rate Qb to be the target flow rate QL (step S11b). When the flow rate Qb has already been controlled to be the target flow rate QL in step S3 described above, this state continues in step S11b. Next, the ECU 60 determines whether or not the required power P is equal to or smaller than the threshold value P1 (step S13b). When No is determined in step S13b, the ECU 60 executes the return control (step S100).

When Yes is determined in step S13b, the ECU 60 obtains the voltage Vb (step S15b), and determines whether or not the voltage Vb is equal to or lower than the lower limit value VLb (step S17b). When No is determined in step S17b, the ECU 60 executes the process of step S11b and the subsequent processes again. That is, as long as Yes is determined in step S13b and No is determined in step S17b, the flow rate Qb is controlled to be the target flow rate QL. For example, the flow rate Qb is controlled to be the target flow rate QL as illustrated after the time t2 described above. Since the process of step S13b is repeatedly executed as long as No is determined in step S17b, the return control is executed, even when the required power increases while the flow rate Qb is controlled to be the target flow rate QL.

When Yes is determined in step S17b, the ECU 60 controls the flow rate Qb to be the target flow rate QH as illustrated, for example, at time t6 (step S21b). Next, the ECU 60 determines whether or not the required power P is equal to or smaller than the threshold P1 (step S23b).

Likewise, when No is determined in step S23b, the return control is executed (step S100).

When Yes is determined in step S23b, the ECU 60 obtains the voltage Vb (step S25b), and determines whether or not the voltage Vb is equal to or higher than the upper limit value VHb (step S27b). When No is determined in step S27b, the ECU 60 executes the process of step S21b again. As long as Yes is determined in step S23b and No is determined in step S27b, the flow rate Qb is controlled to be the target flow rate QH. That is, as illustrated in the period from time t6 to time t8 described above, the flow rate Qb is controlled to be the target flow rate QH. The process of step S23b is repeatedly executed as long as No is determined in step S27b, the return control is executed even when the required power increases while the flow rate Qb is controlled to be the target flow rate QH.

When Yes is determined in step S27b, the ECU 60 executes the process of step S11b and the subsequent processes again, and the flow rate Qb is controlled to be the target flow rate QL, for example, as illustrated at time t8. As described above, the flow rate Qb is alternately controlled to be the target flow rate QH and the target flow rate QL, so that the voltage Vb is controlled to repeatedly increase and decrease between the upper limit value VHb and the lower limit value VLb. The processes of steps S11b, S17b, S21b, and S27b are an example of process executed by the supply system control unit configured to increase and decrease the open circuit voltage of the FC 20b so as to converge within a second target range, by controlling the bypass valve 15b to increase and decrease the flow rate Qb.

Additionally, the process of step S13b may be executed before step S11b, or between steps S15b and S17b. Likewise, the process of step S23b may be executed before step S21b, or between steps 25b and 27b.

As described above, each of the above-described open-circuit voltage control of the FCs 20a and 20b is substantially the same, and the upper limit values VHa and VHb are also the same value. The difference is that the lower limit value VLa is greater than the lower limit value VLb. By setting the upper limit values and the lower limit values in this manner, it is possible to suppress the deterioration of the durability of the supply system that adjusts the flow rate of the cathode gas supplied to the FC 20b while ensuring the response to the required power. This suppresses an increase in the manufacturing cost of the program that executes the open-circuit voltage control of the FC20a and 20b, and suppresses an increase in the process load on the ECU 60.

[Return Control]

When the required power P is equal to or greater than the threshold P1 in the state where the FCs 20a and 20b are disconnected from the load devices, the ECU 60 controls the switches 36a and 36b to electrically connect the FCs 20a and 20b and the load devices as illustrated at time t10. This causes the voltages Va and Vb to decrease immediately. In the connected states, the flow rates Qa and Qb are controlled to increase in response to an increase in the required power P as illustrated at time t11. Thus, the power of the FCs 20a and 20b also increase to satisfy the required power P. Also, when the return control is executed in the open-circuit voltage control of any of the FCs 20a and 20b, both FCs 20a and 20b return to the normal power generation state.

[First Variation of Open-Circuit Voltage Control]

Figure 7A:
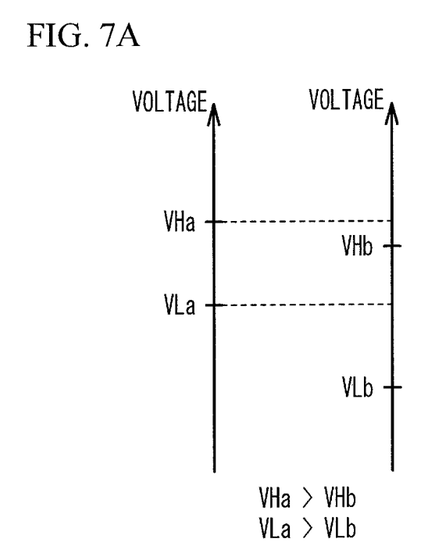
FIGS. 7A to 7D are explanatory views of magnitude relationships among upper limit values and lower limit values in variations of the open-circuit voltage control.

Next, a first variation of the open-circuit voltage control will be described. FIG. 7A is an explanatory view of a magnitude relationship among upper limit values VHa and VHb and lower limit values VLa and VLb in the first variation of the open-circuit voltage control. In the first variation, the upper limit value VHa is greater than upper limit value VHb, the lower limit value VLa is greater than the lower limit value VLb, and the upper limit value VHb is smaller than the upper limit value VHa and greater than the lower limit value VLa. Since the lower limit value VLa is greater than the lower limit value VLb, a period in which the voltage Va is higher than the voltage Vb is ensured, thereby improving the response to an increase in the required power.

Further, since the upper limit value VHb is lower than the upper limit value VHa, the cathode catalyst of the FC 20b is further suppressed from being dissolved, and the power performance of the FC 20b is further suppressed from deteriorating. Such a configuration is suitable in a case of especially suppressing the deterioration of the power performance of the FC20b, for example, in a case of employing a system in which the FC 20b rather than the FC 20a supplies more power to the auxiliary devices, or in a case where the rated output of the FC 20b is greater than the rated output of the FC 20a. In the first variation, it is thus possible to suppress the deterioration of the power performance of the FC 20b more preferentially than the FC 20a while securing the response to an increase in the required power.

In the first variation, like the above-described embodiment, a difference between the upper limit value VHb and the lower limit value VLb is greater than a difference between the upper limit value VHa and the lower limit value VLa, thereby suppressing the deterioration of the durability of the bypass valve 15b. It is thus possible to suppress the deterioration of the durability of the bypass valve 15b which is the auxiliary device of the FC 20b, while suppressing the deterioration of the power performance of the FC 20b, and ensuring the power of the FC 20b for a long time.

In the first variation, for example, the upper limit value VHa is 0.84 V, the upper limit value VHb is 0.82 V, the lower limit value VLa is 0.77 V, and the lower limit value VLb is 0.7 V.

[Second Variation of Open-Circuit Voltage Control]

Figure 7B:
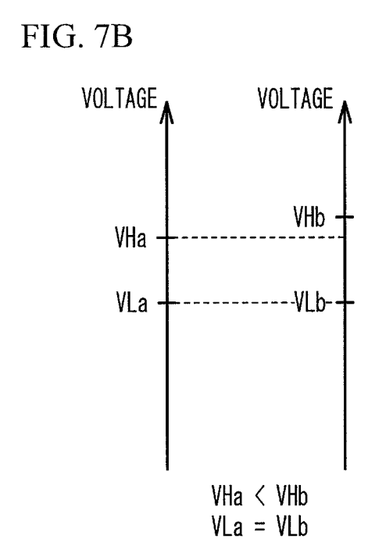

FIG. 7B is an explanatory view of a magnitude relationship among upper limit values VHa and VHb and lower limit values VLa and VLb in a second variation of the open-circuit voltage control. In the second variation, the upper limit value VHb is greater than the upper limit value VHa, the lower limit value VLa and the lower limit value VLb are identical to each other, and the upper limit value VHa is smaller than the upper limit value VHb and greater than the lower limit value VLb. Since the upper limit value VHb is greater than the upper limit value VHa, a period in which the voltage Vb is higher than the voltage Va is ensured, thereby improving the response to an increase in required power. Further, since the upper limit value VHa is lower than the upper limit value VHb, the dissolution of the cathode catalyst of the FC 20a is further suppressed, which suppresses the deterioration of the power performance of the FC 20a. Further, also in the second variation, a difference between the upper limit value VHb and the lower limit value VLb is greater than a difference between the upper limit value VHa and the lower limit value VLa, thereby suppressing the deterioration in the durability of the bypass valve 15b.

Additionally, in the second variation, unlike the above-described embodiment and the first variation and third and fourth variations described later, the target range of the open circuit voltage of the FC 20b corresponds to the first target range, and the target range of the open circuit voltage of the FC 20a corresponds to the second target range. Accordingly, the upper limit value VHb corresponds to the upper limit value of the first target range, and the upper limit value VHa corresponds to the upper limit value of the second target range. In the second variation, for example, the upper limit value VHa is 0.8 V, the upper limit value VHb is 0.84 V, and each of the lower limit values VLa and VLb is 0.75 V.

[Third Variation of Open-Circuit Voltage Control]

Figure 7C:
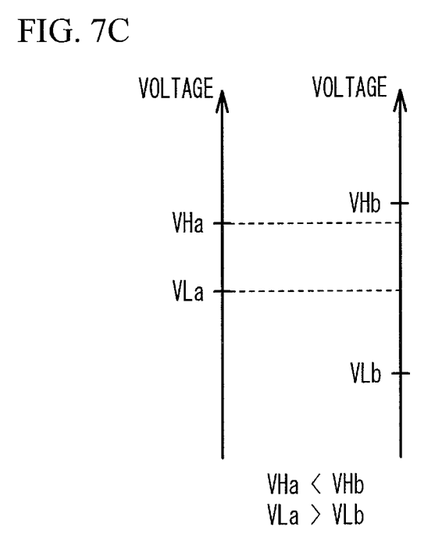

FIG. 7C is an explanatory view of a magnitude relation among upper limit values VHa and VHb and lower limit values VLa and VLb in the third variation of the open-circuit voltage control. In the third variation, the upper limit value VHb is greater than the upper limit value VHa, and the lower limit value VLb is smaller than the lower limit value VLa. Therefore, since a difference between the upper limit value VHb and the lower limit value VLb is greater than a difference between the upper limit value VHa and the lower limit value VLa, the deterioration of the durability of the bypass valve 15b is suppressed. Further, since the upper limit value VHa is lower than the upper limit value VHb, the dissolution of the cathode catalyst of the FC 20a is suppressed, thereby suppressing the deterioration of the power performance of the FC 20a.

In the third variation, for example, the upper limit value VHa is 0.8 V, the upper limit value VHb is 0.84 V, the lower limit value VLa is 0.75 V, and the lower limit value VLb is 0.7 V.

[Fourth Variation of Open-Circuit Voltage Control]

Figure 7D:
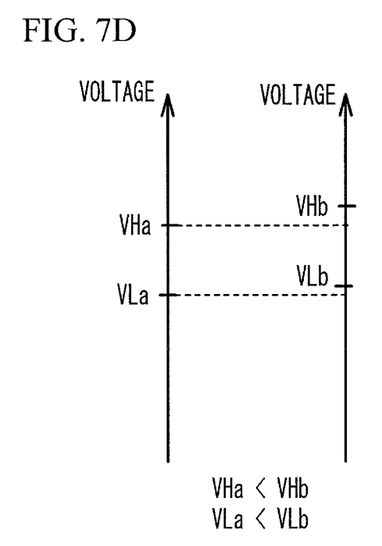

FIG. 7D is an explanatory view of a magnitude relation among upper limit values VHa and VHb and lower limit values VLa and VLb in the fourth variation of open-circuit voltage control. In the fourth variation, the upper limit value VHb is greater than the upper limit value VHa, the lower limit value VLb is greater than the lower limit value VLa, the upper limit value VHa is smaller than the upper limit value VHb and greater than the lower limit value VLb, and the lower limit value VLb is smaller than the upper limit value VHa and greater than the lower limit value VLa. Since the upper limit value VHb is greater than upper limit value VHa and since the lower limit value VLb is greater than the lower limit value VLa, a period in which voltage Vb is higher than voltage Va is ensured, thereby improving the response to an increase in the required power. Also, since the upper limit value VHa is lower than the upper limit value VHb, the dissolution of the cathode catalyst of the FC 20a is suppressed. Further, since a difference between the upper limit value VHb and the lower limit value VLb is greater than a difference between the upper limit value VHa and the lower limit value VLa, the deterioration of the durability of the bypass valve 15b is further suppressed.

In the fourth variation, for example, the upper limit value VHa is 0.8 V, the upper limit value VHb is 0.84 V, the lower limit value VLa is 0.75 V, and the lower limit value VLb is 0.77 V.

Also in the first to fourth variations, the target voltages of the voltages Va and Vb partially overlap each other, which suppresses a difference between the FCs 20a and 20b in the power performance due to the execution of the open-circuit voltage control.

In the above-described embodiment and variations, the target flow rate QL may be zero.

As illustrated in FIG. 2, the open circuit voltage is controlled by adjusting the flow rates Qa and Qb in a rectangular shape, but not limited thereto. At least one of the flow rates Qa and Qb may be adjusted to gradually increase and decrease linearly or curvilinearly, or may be adjusted in a sine wave manner.

The flow rate Qa is controlled by adjusting the opening degree of the bypass valve 15a in the embodiment and the variation described above, but not limited thereto. The flow rate Qa may be controlled by adjusting at least one of the rotational speed of the air compressor 14a, the opening degree of the bypass valve 15a, and the opening degree of the back pressure valve 17a. For example, when the flow rate Qa is controlled to be the target flow rate QL from a state where the flow rate Qa is greater than the target flow rate QL, only the rotational speed of the air compressor 14a may be decreased without changing the opening degrees of the bypass valve 15a and the back pressure valve 17a. Alternatively, only the opening degree of the back pressure valve 17a may be decreased without changing the rotational speed of the air compressor 14a and the opening degree of the bypass valve 15a. Additionally, in the case of adjusting only the rotational speed of the air compressor 14a to control the flow rate Qa, the energy loss amount due to the air compressor 14a is decreased, as compared with the case of adjusting only the opening degree of the bypass valve 15a or the back pressure valve 17a. The same applies to the flow rate Qb.

The system 1 described above includes, but not limited to, the two air compressors 14a and 14b. For example, instead of the two air compressors 14a and 14b, a single air compressor and pipes connecting the air compressor and both supply pipes 11a and 11b are provided, and the flow rates Qa and Qb may be controlled by controlling the opening degrees of the bypass valves 15a and 15b and the back pressure valves 17a and 17b.

The system 1 described above includes two FCs 20a and 20b, but may include three or more fuel cells. In this case, at least two open circuit voltages of the fuel cells may be controlled as described above. Also in this case, it is possible to suppress the open circuit voltages of all the fuel cells from being brought into the low states.

The fuel cell system is installed on the vehicle, but not limited thereto. For example, a stationary fuel cell system may be used. The vehicle may be not only a car but also a motorcycle, a railway vehicle, a ship, an aircraft or the like. Further, the vehicle may be a hybrid vehicle that use a motor and an internal combustion engine together.

Although some embodiments of the present disclosure have been described in detail, the present disclosure is not limited to the specific embodiments but may be varied or changed within the scope of the present disclosure as claimed.

The invention claimed is:

1. A fuel cell system comprising:
a fuel cell unit including first and second fuel cells that supplies electric power to a load device;
first and second supply systems configured to respectively control first and second flow rates of cathode gas respectively supplied to the first and second fuel cells;
a switching device capable of switching the fuel cell unit and the load device between an electrically connected state where the fuel cell unit is electrically connected to the load device and an electrically disconnected state where the fuel cell unit is electrically disconnected from the load device;
a switching control unit configured to switch the fuel cell unit and the load device to the electrically disconnected state, when required power of the fuel cell unit is equal to or smaller than a threshold;
an open circuit voltage obtaining unit configured to obtain a first open circuit voltage of the first fuel cell and a second open circuit voltage of the second fuel cell in the electrically disconnected state; and
a supply system control unit programmed to increase and decrease the first and second open circuit voltages so as to respectively converge within first and second target ranges, by controlling the first and second supply systems to increase and decrease the first and second flow rates, wherein a lower limit value of the first target range is greater than a lower limit value of the second target range.

2. The fuel cell system of claim 1, wherein a size of one of the first and second target ranges is larger than the other one of the first and second target ranges.

3. The fuel cell system of claim 1, wherein the first and second target ranges at least partially overlap each other.

4. The fuel cell system of claim 1, wherein an upper limit value of the first target range is identical to an upper limit value of the second target range.

5. The fuel cell system of claim 1, wherein an upper limit value of the first target range is greater than an upper limit value of the second target range.

6. A fuel cell system comprising:
a fuel cell unit including first and second fuel cells that supply electric power to a load device;
first and second supply systems configured to respectively control first and second flow rates of cathode gas respectively supplied to the first and second fuel cells;
a switching device capable of switching the fuel cell unit and the load device between an electrically connected state where the fuel cell unit is electrically connected to the load device and an electrically disconnected state where the fuel cell unit is electrically disconnected from the load device;
a switching control unit configured to switch the fuel cell unit and the load device to the electrically disconnected state, when required power of the fuel cell unit is equal to or smaller than a threshold;
an open circuit voltage obtaining unit configured to obtain a first open circuit voltage of the first fuel cell and a second open circuit voltage of the second fuel cell in the electrically disconnected state; and
a supply system control unit programmed to increase and decrease the first and second open circuit voltages so as to respectively converge within first and second target ranges, by controlling the first and second supply systems to increase and decrease the first and second flow rates,
wherein
a lower limit value of the first target range is equal to a lower limit value of the second target range, and an upper limit value of the first target range is greater than an upper limit value of the second target range.

* * * * *